United States Patent [19]
Olkowski, Jr.

[11] Patent Number: 6,149,474
[45] Date of Patent: Nov. 21, 2000

[54] VEHICLE PROPULSION SYSTEM

[76] Inventor: Stanley Olkowski, Jr., 23303 W. Lebost Dr., Novi, Mich. 48375-3414

[21] Appl. No.: 09/093,582

[22] Filed: Jun. 8, 1998

Related U.S. Application Data

[60] Provisional application No. 60/049,007, Jun. 9, 1997.

[51] Int. Cl.⁷ .................................................. B60F 3/00
[52] U.S. Cl. ..................................... 440/12.63; 440/12.64
[58] Field of Search ........................... 440/12.63, 12.64, 440/95, 96, 97; 180/192; 305/120, 165, 34, 157, 178

[56] References Cited

U.S. PATENT DOCUMENTS

| | | |
|---|---|---|
| 1,727,089 | 9/1929 | Woick . |
| 1,913,605 | 6/1933 | Martin . |
| 2,702,212 | 2/1955 | McAneny ................................. 305/9 |
| 2,756,830 | 7/1956 | Hurthig ................................. 180/9.1 |
| 2,914,017 | 11/1959 | Ruger ...................................... 115/1 |
| 3,108,564 | 10/1963 | Prosser .................................... 115/1 |
| 3,112,727 | 12/1963 | Kiefer ...................................... 115/1 |
| 3,180,305 | 4/1965 | Gower-Rempel ................... 440/12.63 |
| 3,306,250 | 2/1967 | Pitchford . |
| 3,311,424 | 3/1967 | Taylor ..................................... 305/12 |
| 3,418,961 | 12/1968 | Gregg ....................................... 115/1 |
| 3,534,701 | 10/1970 | Hebert ...................................... 115/1 |
| 3,656,450 | 4/1972 | Farman .................................... 115/63 |
| 3,760,763 | 9/1973 | Brusacoram ........................... 115/1 R |
| 3,968,766 | 7/1976 | House ................................. 440/12.67 |
| 3,976,025 | 8/1976 | Russell .................................. 115/1 R |
| 4,102,292 | 7/1978 | Hunter et al. ......................... 115/1 R |
| 4,383,794 | 5/1983 | Sankey .................................... 414/694 |
| 4,433,634 | 2/1984 | Coast ...................................... 114/270 |
| 4,568,294 | 2/1986 | Owsen .................................... 440/95 |
| 4,671,774 | 6/1987 | Owsen .................................... 440/95 |
| 4,817,554 | 4/1989 | Prestenbach .......................... 114/270 |
| 4,821,824 | 4/1989 | Gilbert ................................... 180/9.28 |
| 4,825,969 | 5/1989 | King et al. ............................ 180/9.1 |
| 4,846,091 | 7/1989 | Ives ........................................ 114/270 |
| 4,961,395 | 10/1990 | Coast ...................................... 114/270 |
| 5,318,141 | 6/1994 | Hansen .................................... 180/8.2 |

*Primary Examiner*—Sherman Basinger
*Attorney, Agent, or Firm*—Harness, Dickey & Pierce, P.L.C.

[57] ABSTRACT

The present invention relates to a vehicle propulsion system. In an exemplary use described, the vehicle propulsion system is intended for a personal amphibious vehicle capable of efficiently transversing water, snow, land, ice and the like. In a preferred form, the vehicle propulsion system includes a pair of continuous belt tracks which are independently driven from a power plant.

12 Claims, 8 Drawing Sheets

VEHICLE PROPULSION SYSTEM

CROSS-REFERENCE TO RELATED APPLICATION

This application is based on provisional patent applications which have been assigned U.S. Ser. No. 60/049,007 (filed Jun. 9, 1997).

BACKGROUND OF THE INVENTION

1. Technical Field

The present invention generally relates to vehicle propulsion systems. More particularly, the present invention relates to a propulsion system for an amphibious vehicle having a continuous belt track suitable for use on water, land, snow and virtually any other terrain.

2. Discussion

Increased consumer popularity has been recently experienced in a boating market segment directed to personal watercrafts. Such personal watercrafts are typically sled-like in design and intended for use by one or two persons. An elongated cushioned seat extends above a buoyant underbody. Propulsion of conventional personal watercraft is typically provided by air jets controlled by a handle mounted throttle. Use of conventional personal watercraft is strictly limited to bodies of water of sufficient depth to float the watercraft.

Conventional personal watercraft share an aesthetic design theme with snowmobiles. Also similar is the general manner in which personal watercraft and snowmobiles are driven. Distinct from personal watercrafts, snowmobiles include a forward pair of skis and a rearward belt drive for providing a source of propulsion. The construction of conventional snowmobiles require an operating terrain of snow, ice, or the like.

These two types of vehicles typically appeal to the same market segment. Often times, owners of personal watercraft will also own snowmobiles.

Personal vehicles, including but not limited to personal watercraft and snowmobiles, are almost exclusively limited to a single operating terrain (e.g., water, snow, etc.). However, in an attempt to overcome the inherent lack of flexibility for such personal vehicles, various types of amphibious vehicles have been proposed. For example, an amphibious hovercraft have been developed which typically employ ducted air propellers for free forward motion and directional control over land, water, snow, and ice. Low speed thrust and lack of control in crosswinds or when climbing or descending steep slopes are problems which have plagued such vehicles. Air propeller performance in terms of thrust, efficiency, and noise level in terms of drivetrain and mounting have presented serious constraints to hovercraft performance and fuel economy.

Hybrid amphibious vehicles utilizing an alternative form of propulsion in the form of paddle tracks have also been proposed. However, these vehicles have proven to provide inadequate thrust and efficiency at speed over water. Hydrodynamic design considerations were over-ridden by the need for adequate traction over land, snow, ice and the like.

The present invention was developed in an attempt to overcome the disadvantages of both types of propulsion arrangements including but not limited to the disadvantages discussed above. For reasons which will become clear below, the present invention is considered inherently useful in a variety of other applications where propulsion over multiple types of terrain is desired. Thus, the present invention is not to be regarded as being limited to application for personal amphibious vehicles.

SUMMARY OF THE INVENTION

It is a principal object of the present invention to overcome the disadvantages of the prior art, including but not limited to those discussed above.

It is a more particular object to provide an amphibious vehicle having a continuous belt track suitable for efficient use on water, land, snow and other terrains.

It is another object of the present invention to provide a propulsion system for a vehicle including a pair of independently controllable continuous belt tracks.

It is another object of the present invention to provide an improved vehicle propulsion system for virtually any and all terrain surfaces by increasing and optimizing track surface contact area, thereby minimizing vehicle weight distribution unit loading of the track to the terrain surface on virtually any size vehicle. It is another object of the present invention to provide maximum maneuverability through totally independent speed and directional controlled tracks.

It is another object of the present invention to reduce or virtually eliminate vehicle design concerns regarding centerline-of-vehicle underbody/hull ground clearance requirements resulting from tracks fully extending under the vehicle, to as close as practical to the vehicle centerline, whereby the underbody is isolated and protected from the terrain surface and obstacles by optimizing propulsion tracks.

It is another object of the present invention to provide an amphibious vehicle with increased water speed capability resulting from reduced water displacement and drag due to the hydroplaning effect which lifts the body out of the water.

It is another object of the present invention to provide an improved location characteristics especially on deep snow, thin ice, loosely packed sand, or gravel, mud or swampy terrain through increased vehicle load support surface contact area and proportionally decreased vehicle weight distribution unit area loading.

BRIEF DESCRIPTION OF THE DRAWINGS

Additional benefits and advantages of the present invention will become apparent to those skilled in the art to which this invention relates from a reading of the subsequent description of the preferred embodiment and the appended claims, taken in conjunction with the accompanying drawings, wherein:

DETAILED DESCRIPTION OF THE PREFERRED EMBODIMENT

Figure 1:
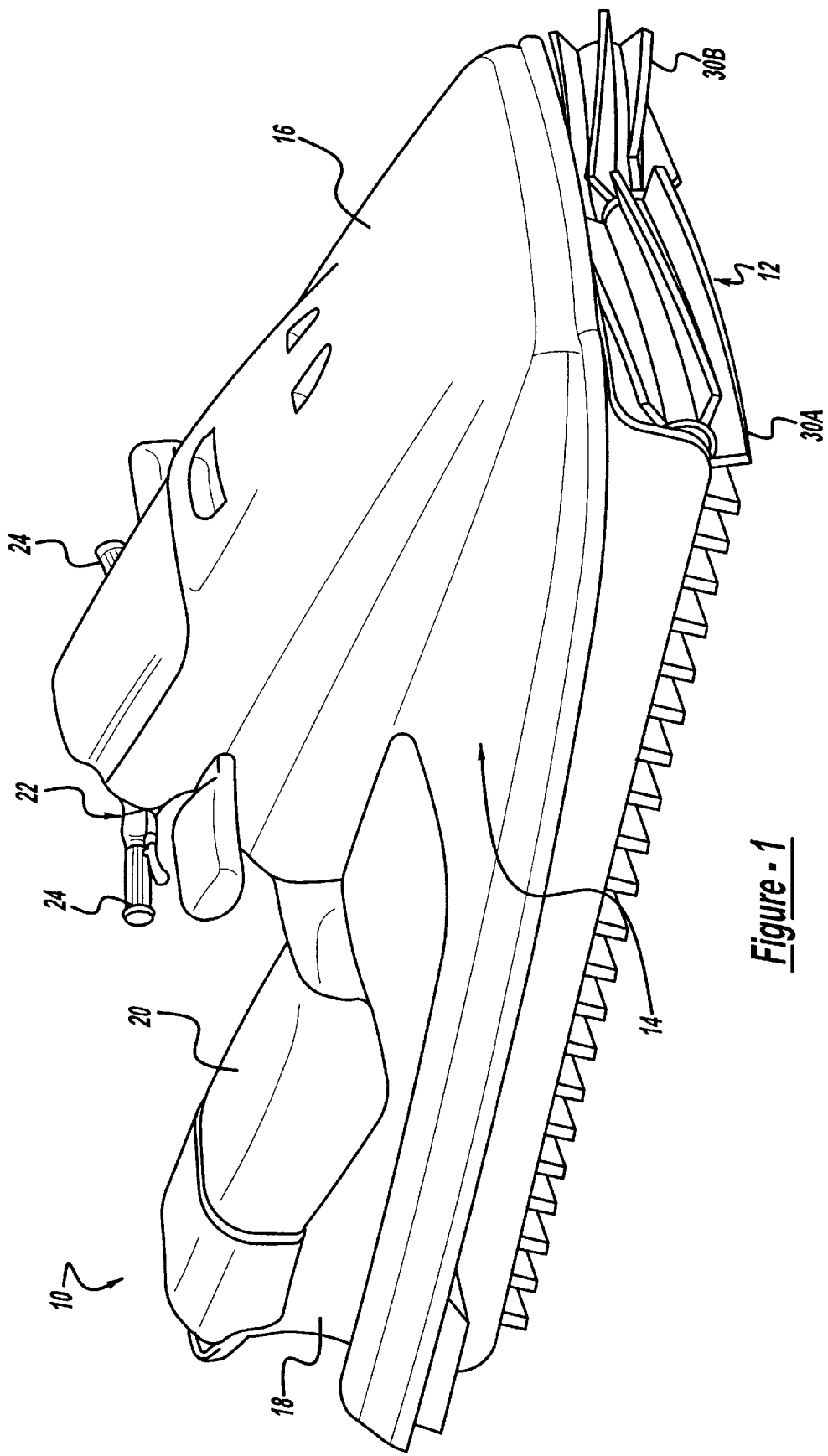
FIG. 1 is a perspective view of an amphibious vehicle constructed in accordance with the teachings of a preferred embodiment of the present invention.

Referring to FIG. 1, a perspective view of an exemplary vehicle 10 incorporating a propulsion system 12 constructed in accordance with the teachings of a preferred embodiment of the present invention is shown. The exemplary vehicle 10 is illustrated as a personal amphibious vehicle 10. However, it will become apparent to those skilled in the art that the teachings of the present invention have applicability to various other types of vehicles.

Prior to addressing the construction and operation of the propulsion system 12 of the present invention, a brief understanding of the exemplary vehicle 10 is warranted. As shown in FIG. 1, the personal amphibious vehicle includes a main body 14 constructed from fiberglass or other similar material. The main body 14 includes a forward portion 16 and a rearward portion 18, the forward portion 16 conceals a power plant. As will become more apparent below, the power plant serves to drive the propulsion system 12. In this exemplary embodiment, the power plant includes an internal combustion engine.

The rearward portion 18 of the body 14 supports a longitudinally extending cushioned seat 20. As shown, the cushioned seat 20 is adapted to comfortably accommodate one or two passengers.

The personal amphibious vehicle 10 is further shown to include a handle assembly 22 including a pair of grip members 24. One of the grip members 24 is rotatably attached to the handle assembly 22 and functions as a throttle for the internal combustion engine. Steering of the personal amphibious vehicle 10 is controlled through rotation of the handle assembly 22 about a central axis. Further discussion of the function of the steering of the personal amphibious vehicle 10 is provided below.

With continued reference to FIG. 1 and additional reference to FIGS. 2–5, and 7–8, the propulsion system 12 of the present invention will now be further described. The propulsion system 12 of the amphibious vehicle 10 of the present invention is shown to include first and second continuous belt tracks 30a and 30b. As will become more apparent below, the first and second continuous belt tracks 30a and 30b are substantially identical. Thus, a complete understanding of the second continuous belt track 30b can be understood from the description of the first continuous belt track 30a which follows.

The continuous belt track 30a is preferably constructed unitarily from rubber. One suitable material is black rubber having a durometer of 35–40. However, it will be understood by those skilled in the art that any of a number of suitable materials may be incorporated. Preferably, the material is capable of withstanding a temperature range of approximately −70° F. to 130° F. without cracking or embrittling for at least two years. Furthermore, it is desirable that the material is capable of withstanding intense sunlight, fresh and salt water, motor oil and gasoline.

Figure 6:
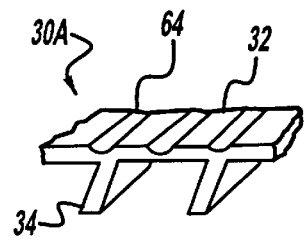
FIG. 6 is a partial view similar to FIG. 5 showing an alternative construction for the continuous belt track of the present invention.

The continuous belt track 30a is shown to include a belt portion 32 and a plurality of blades 34. The blades 34 are equally spaced about the perimeter of the belt 32. A blade angle α is established between each of the blades 34 and the belt 32. A skew angle β (shown in FIG. 3) is established between each of the blades 34 and a line extending perpendicular to the longitudinal axis of the belt 32. In the preferred embodiment, the blade angle α is approximately 90° and the skew angle β is approximately 7–12°. In the alternative embodiment of the continuous belt track 30a shown in FIG. 6, the skew angle β remains approximately 7–12° and the blade angle α has been changed to approximately 97–102°. It will be appreciated by those skilled in the art that the particular angles α and β identified herein are exemplary in nature only. In this regard, these angles may be subject to modification for particular applications within the scope and spirit of the present invention.

Figure 13:
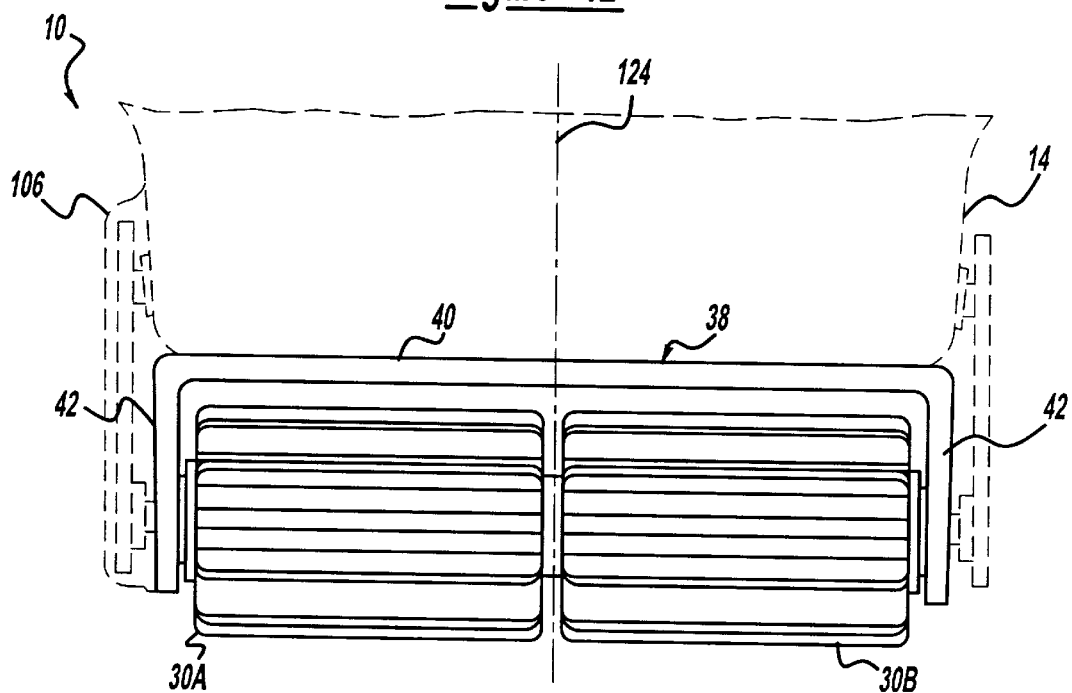
FIG. 13 is a rear view the tracks and mounting bracket of the amphibious vehicle of the present invention.

The skew angle β is such that each blade 34, in bottom view, angles towards the front of the personal amphibious vehicle 10 as it progresses from an outboard side of the amphibious vehicle 10 to the vehicle centerline. The first and second continuous belt tracks 30a and 30b are ambidextrous. The second track 30b is merely rotated 180° in a horizontal plane upon installation. This interchangeability of the tracks 30a and 30b provides a manufacturing advantage. In certain applications, it may be desirable that the width of the continuous belt track 30a overhangs the drive shaft (which will be discussed immediately below) to optimize loading area. Such an arrangement is shown in the rear view of the tracks 30a and 30b and mounting bracket 38 of FIG. 13.

In one application, the circumference of the continuous belt track 30a is approximately 200 inches. In this application, the width of the continuous belt track 32 is approximately 24 inches. Furthermore, the blades 34 are approximately 49 in number and have a width of approximately 0.63 inches. Again, the stated dimensions are merely exemplary of a single proposed embodiment.

Figure 2:
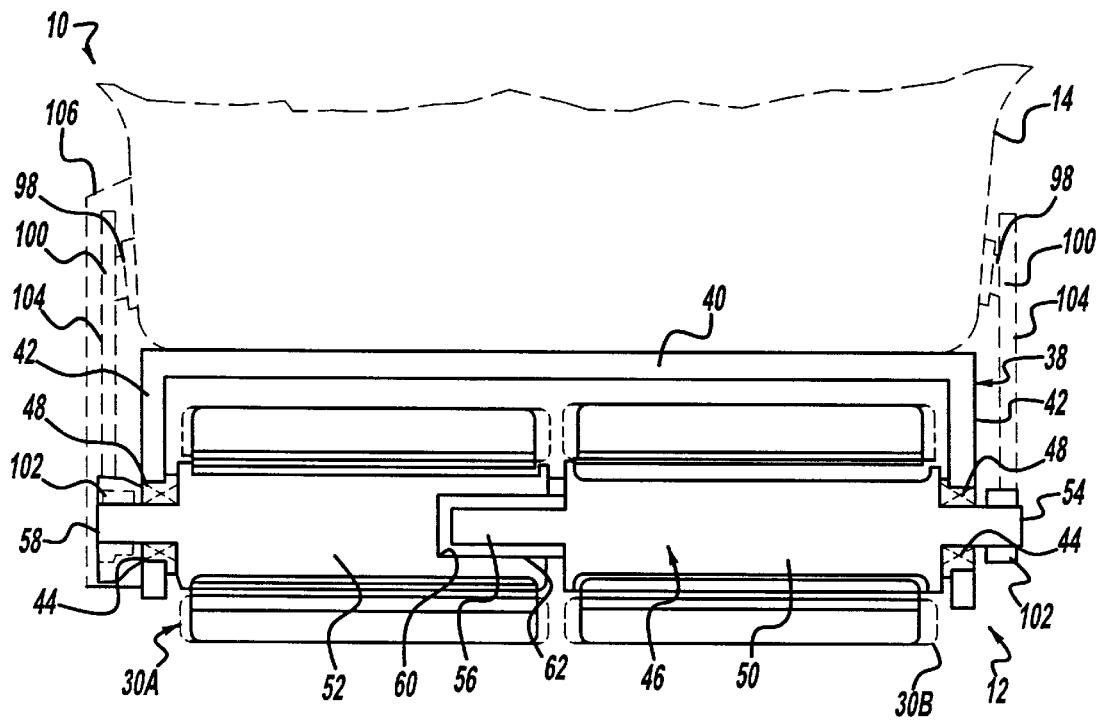
FIG. 2 is a cross-sectional view taken through a driving axle of the amphibious vehicle of FIG. 1.
Figure 5:
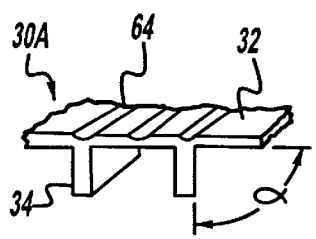
FIG. 5 is a perspective view of a portion of the continuous belt track of FIG. 3.

With continued reference to FIG. 2, the first and second continuous belt tracks 30a and 30b are shown interconnected to the body 14 of the amphibious vehicle 10 through a mounting bracket 38. The mounting bracket 38 is generally U-shaped and includes a first portion attached to an underside of the body 14 in a conventional manner. The mounting bracket 38 includes two spaced apart, downwardly extending legs 42. Each leg 42 is formed to include an aperture 44 for rotatably supporting a drive shaft 46. The drive shaft 46 is supported within the apertures 44 through suitable bearings 48. It will be understood that alternatively the mounting bracket may be internally molded with the body 14.

In the embodiment illustrated, the drive shaft 46 is illustrated to be of split-shaft construction. In this regard, the drive shaft 46 includes first and second cylindrical portion 50 and 52. The first cylindrical portion includes an outboard reduced diameter portion 54 and an inboard reduced diameter portion 56. The second portion 52 similarly includes an outboard reduced portion 58. The second portion 52 is further formed to include a cylindrical recess 60 for rotatably receiving the inboard reduced diameter portion 56 of the first portion 50. A suitable bearing 62 is located between the first and second portions 50 and 52 to facilitate rotation therebetween.

Further in the preferred embodiment, the outer diameter of the first and second portions 50 and 52 of the driveshaft 46 is splined (not specifically shown) so as to engage transversely disposed grooves 64 (shown in FIGS. 5 and 6) formed on the inner periphery of the belt 32. Alternatively, it will be understood that the drive shaft 46 may be serrated, knurled or smooth.

In the exemplary embodiment, the propulsion system 12 includes a single driving axle 46 and at least one not-driven axle (not shown). The non-driven axle is identical to the driving axle 46 with the exception that the reduced diameter ends 54 and 58 need not extend beyond the bearings 44. Further, the non-driven axles may be mounted to the body 14 in a manner similar to that described with respect to the drive axle 46. In the preferred embodiment, the drive axle 46 is the front axle, however, the driven axle 46 may alternatively be the front axle.

It will appreciated by those skilled in the art that the personal amphibious vehicle 10 may incorporate three or more axles, any number of which may be driven by the power plant. Multiple drive axles may be employed to split the distribution of driving torque into smaller increments per driving axle. In addition, coast rollers or a combination of coast rollers and driving axle track rollers may be installed between the front and rear axles for more uniform vehicle weight and load distribution. Coast axle rollers need not be the same size diameter as the driving axle track rollers. Regardless of the number of axles, one or more axles may have adjustable centerline to centerline distances, either by slotted means or by positive screw adjustment, or a combination thereof, in order to maintain proper slack of the track 30A, for track roller to track driving friction requirements.

Figure 8:
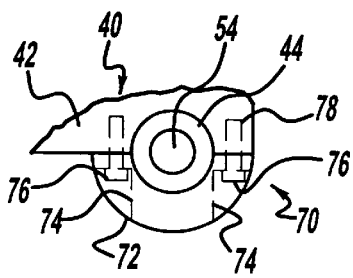
FIG. 8 a side view of a preferred arrangement for interconnecting the drive shaft with the body of the amphibious vehicle of FIG. 1.
Figure 9:
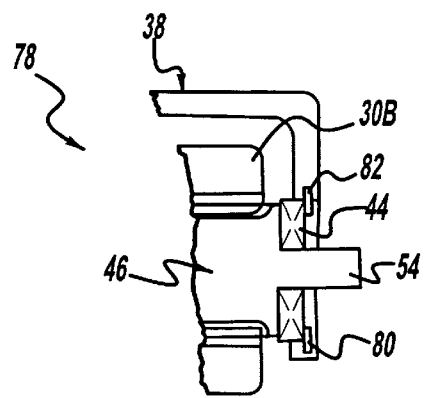
FIG. 9 is a first alternative arrangement for interconnecting the drive shaft with the body of the amphibious vehicle.
Figure 3:
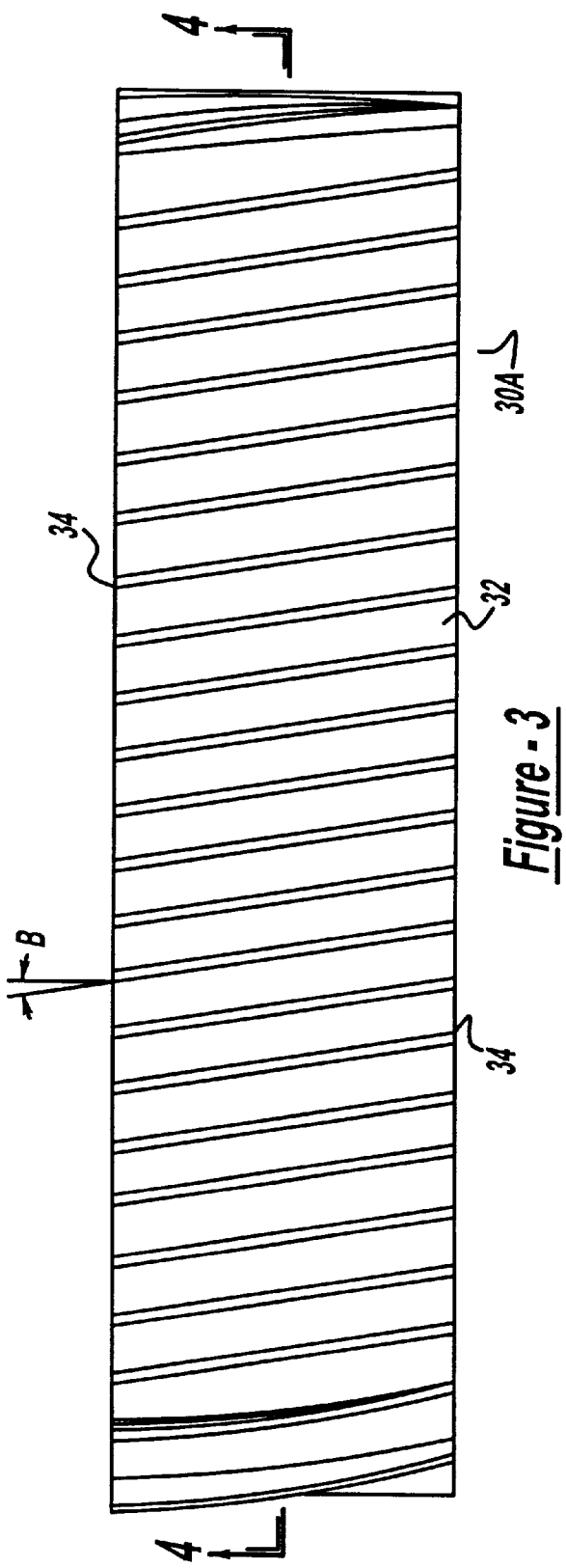
FIG. 3 is a plan view of an underside of one of the continuous belt tracks illustrated in FIG. 1.
Figure 4:
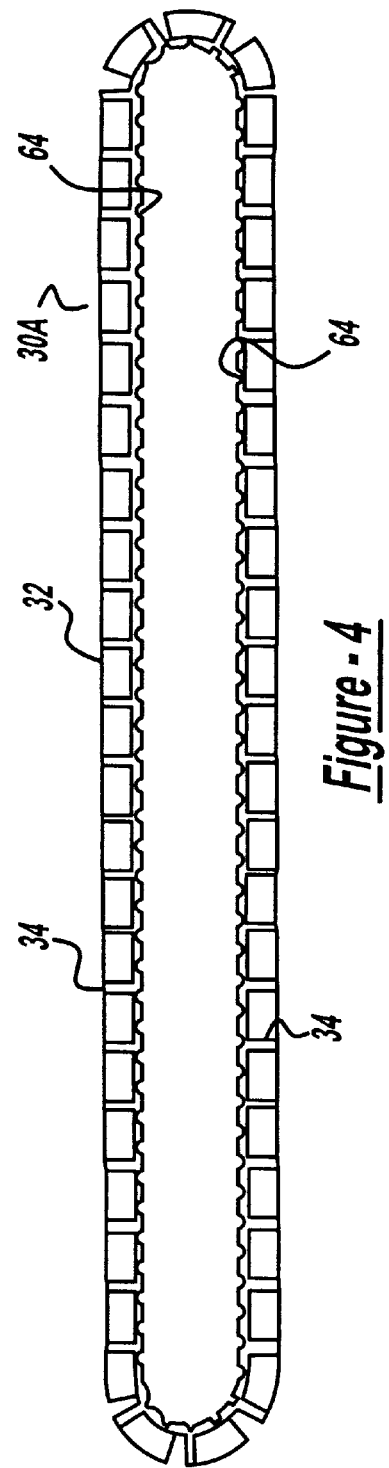
FIG. 4 is a cross-sectional view taken along the line 4—4 of FIG. 3.

With reference specifically to FIG. 8, the preferred embodiment of the propulsion system 12 of the present invention is shown to include a split bearing clamp 70 for interconnecting the drive shaft 46 to the mounting bracket 38. As illustrated, the split bearing clamp 70 includes an arcuate segment 72 formed to include a pair of counterbored holes 74 for receiving threaded fasteners 76. The threaded fasteners 76 engage threaded apertures 78 formed in the downwardly extending arms 42 of the mounting flange 40.

Alternative arrangements mounting the drive shaft 46 to the mounting bracket 38 are shown in FIGS. 9–12. In a first alternative arrangement 78 shown in FIG. 9, the mounting bracket 38 is unitarily constructed to include a solid bore 80 for receiving the bearing 44. A thrust ring 82 prevents lateral displacement of the drive shaft 46. The second alternative arrangement 84 shown in FIG. 10 incorporates a thrust bearing 86 for prevent lateral displacement of the drive shaft 46. In this arrangement 84, the sprocket and chains or transfer gears (which will be discussed below) are mounted inboard of the downwardly extending arms 42 of the mounting bracket and thrust bearings 86. In a third alternative arrangement 90 shown in FIG. 11, the bearing 44 supporting the drive shaft 46 is formed with a mounting flange 92 for attachment to the mounting bracket 38 with threaded fasteners.

Returning to FIG. 2, the propulsion system 12 of the present invention is shown in exemplary form to include a pair of output shafts 98 extending from the body 14 of the personal amphibious vehicle 10. The output shafts 98 are driven by the power plant. Significantly, the output shafts 98 can be driven at different speeds to control steering of the vehicle 10. Interconnection between the internal combustion engine of the power plant may be accomplished in any of a number of manners well known in the art. In the exemplary embodiment conventional rotation of the steering assembly 22 functions to distribute output torque accordingly between the two output shafts 98. In this manner, the vehicle can be steered by the operator in a fashion familiar to the operator.

A drive gear 100 is attached to each of the output shafts 98. Driven gears 102 are fixedly attached to the ends of the reduced diameter portions 54 and 58 of the drive shaft 46. The drive gears 98 are operatively interconnected to their corresponding drive gears 102 through a drive chain 104. Alternatively, it will be appreciated that the drive gear 98, driven gears 102, and drive chain 104 can be replaced with meshing gears (not shown). The left side of FIG. 2 further shows an optional gear cover 106.

Figure 12:
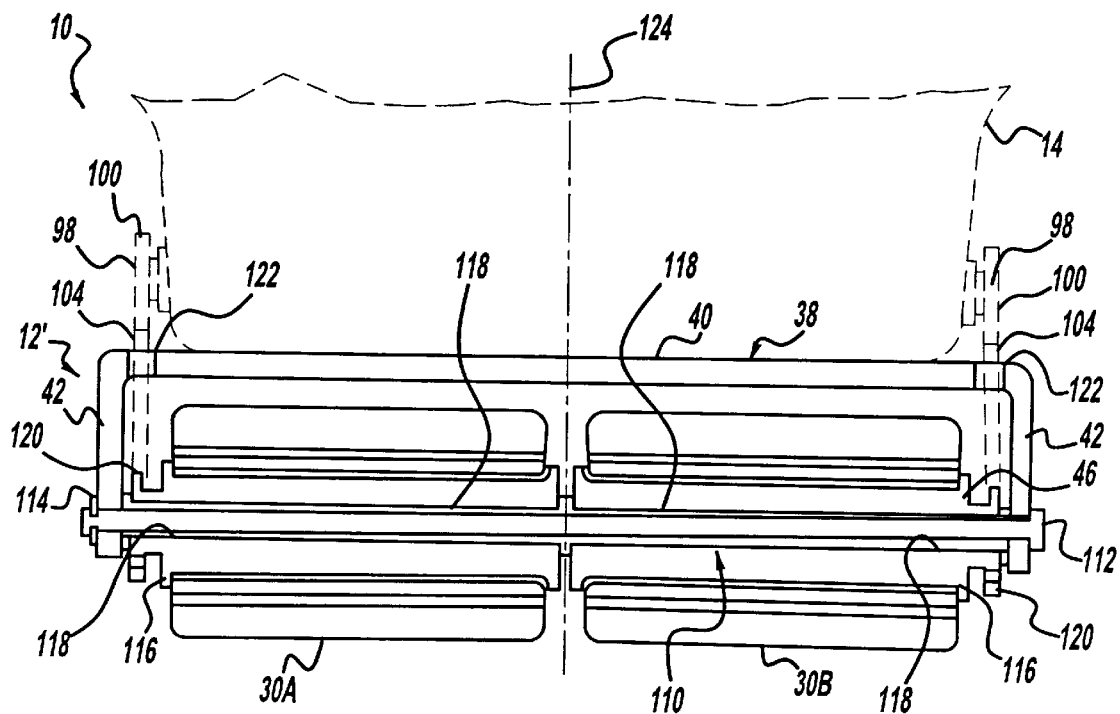
FIG. 12 is a cross-sectional view similar to FIG. 2, illustrating a fourth alternative arrangement for interconnecting the drive shaft with the body of the amphibious vehicle.

With reference to the cross-sectional view of FIG. 12, a first alternative construction of the propulsion system of the present invention is illustrated. The propulsion system 12' is shown to incorporate a fixed axle 110 traversing the width of the personal amphibious vehicle 10. At a first end, the fixed axle includes a shoulder 112. At the other end, the fixed axle 110 is retained by a retaining ring 114. The propulsion system 12' is further shown to include a pair of drive rollers 116. The drive rollers 116 are mounted to the fixed axle 110 through suitable bearings 118. An output end of each of the drive rollers 116 is integrally formed to include a driven gear 120. As with the preferred embodiment, the driven gears 120 are interconnected with drive gears 98 through drive chain 104. The drive chain 104 passes through an opening 122 formed in the mounting bracket 38. Thus, the drive chain 104 and driven gears 120 are located inboard of the mounting flange 38. The details of the first alternative embodiment 12' shown in FIG. 12 are substantially identical to the preferred embodiment most clearly shown in FIG. 2.

Figure 7:
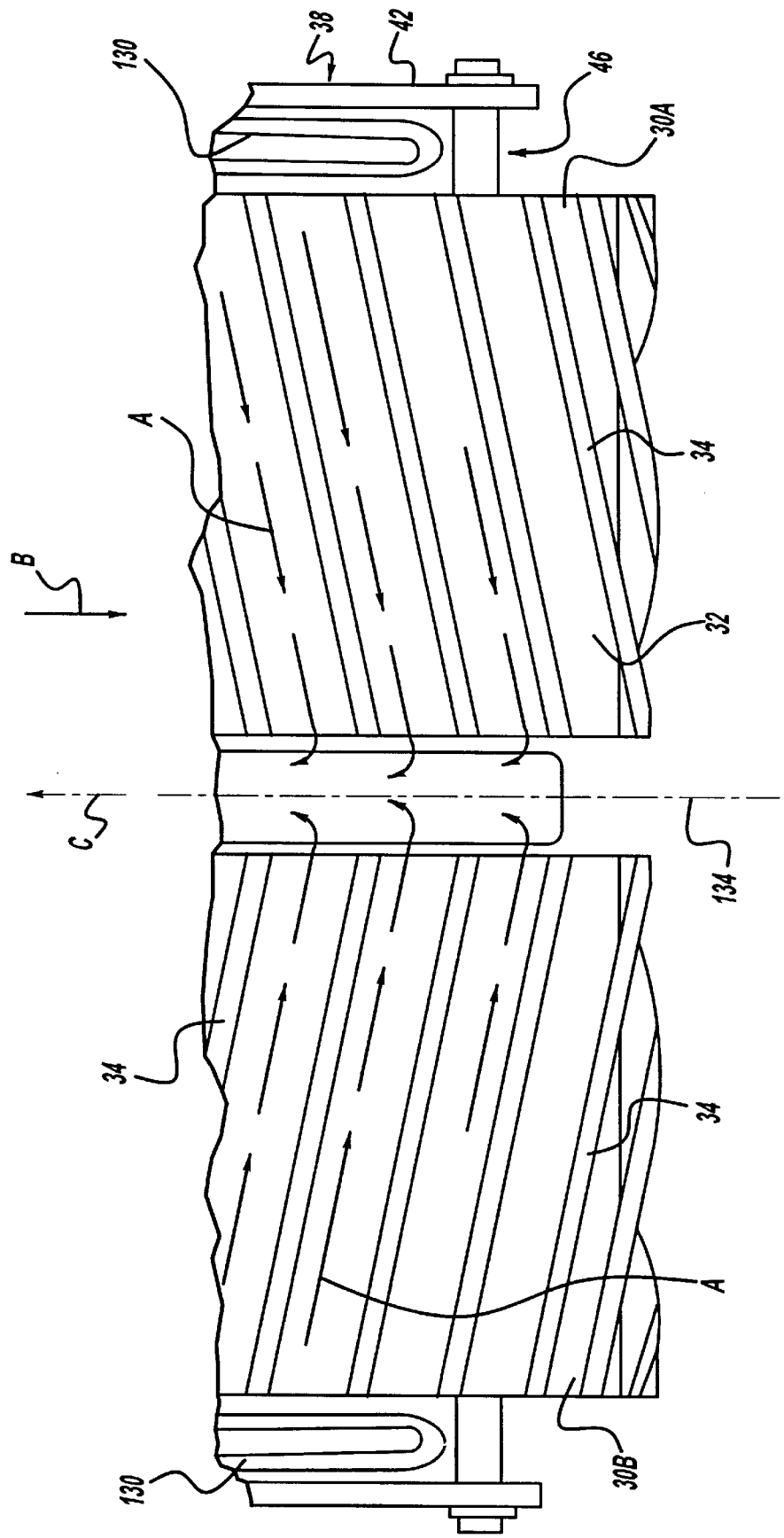
FIG. 7 is a partial bottom view of the amphibious vehicle of the present invention.
Figure 11:
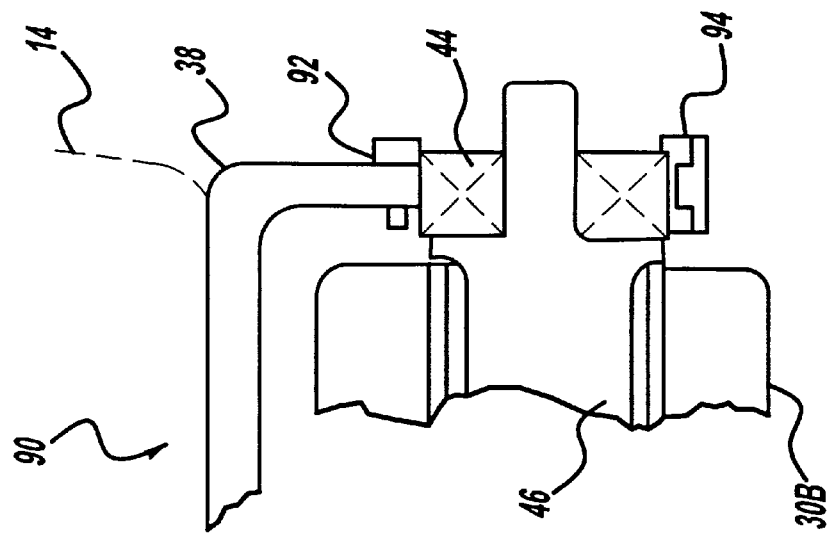
FIG. 11 is a third alternative arrangement for interconnecting the drive shaft with the body of the amphibious vehicle.
Figure 10:
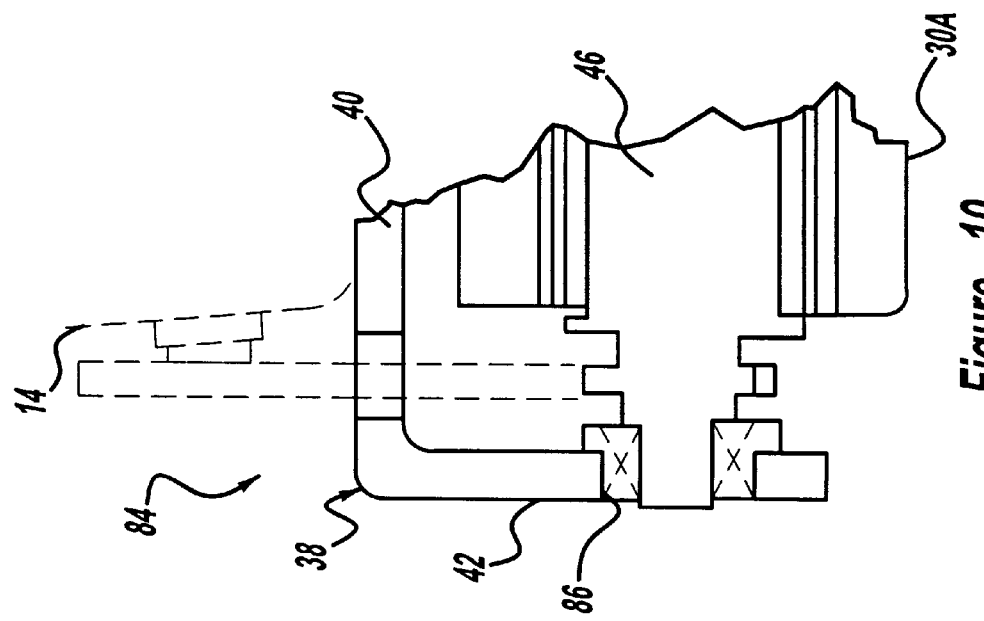
FIG. 10 is a second alternative arrangement for interconnecting the drive shaft with the body of the amphibious vehicle.
Figure 15:
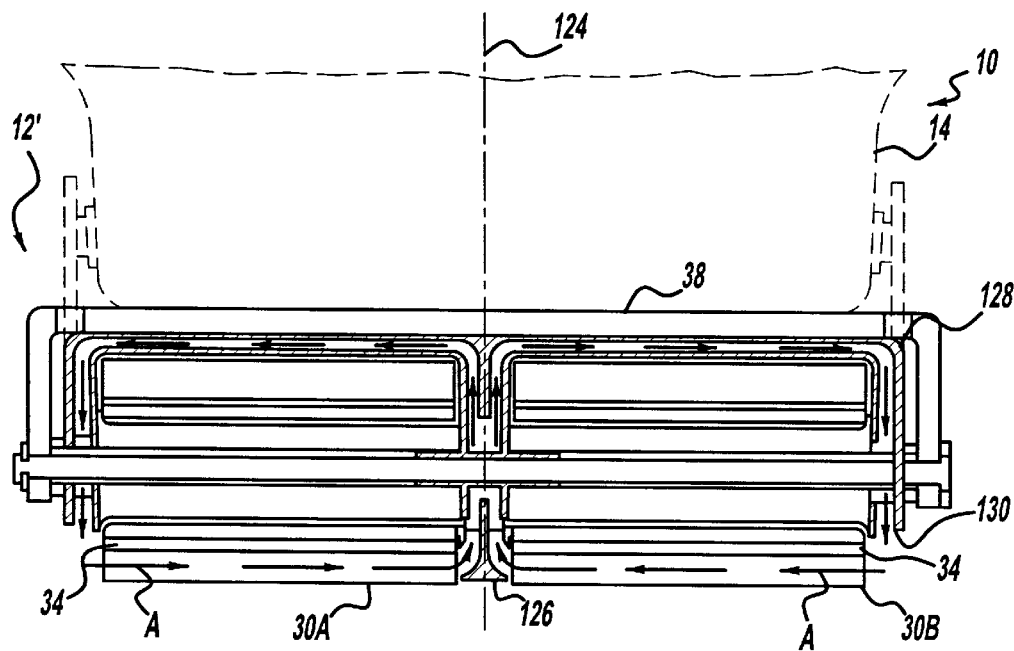
FIG. 15 is a sectional view illustrating the enhanced vertical thrust lift water flow cavity of the present invention.

With reference to FIG. 7 and 15, the first alternative embodiment of the propulsion system 12' of the present invention is illustrated to further incorporate an enhanced vertical thrust lift water flow cavity. The direction of water flow is indicated by the arrows A. The direction of vehicle travel in a forward direction is identified by arrow B and the direction of track travel is identified by arrow C. As shown, the water flow A enters from both outboard sides of the personal amphibious vehicle and between adjacent blades 34 of the tracks 30a and 30b. The water flow A is forced to a location substantially adjacent the vehicle centerline 124. A central divider 126 diverts the water flow A upward into a cavity 128. The cavity 128 continues around the top of the corresponding track 30a or 30b until it is released at a discharge port 130. The first alternative embodiment 12' provides increased water speed capability resulting from reduced water displacement and drag due to the hydroplaning effect which lifts the body 14 out of the water.

Figure 14:
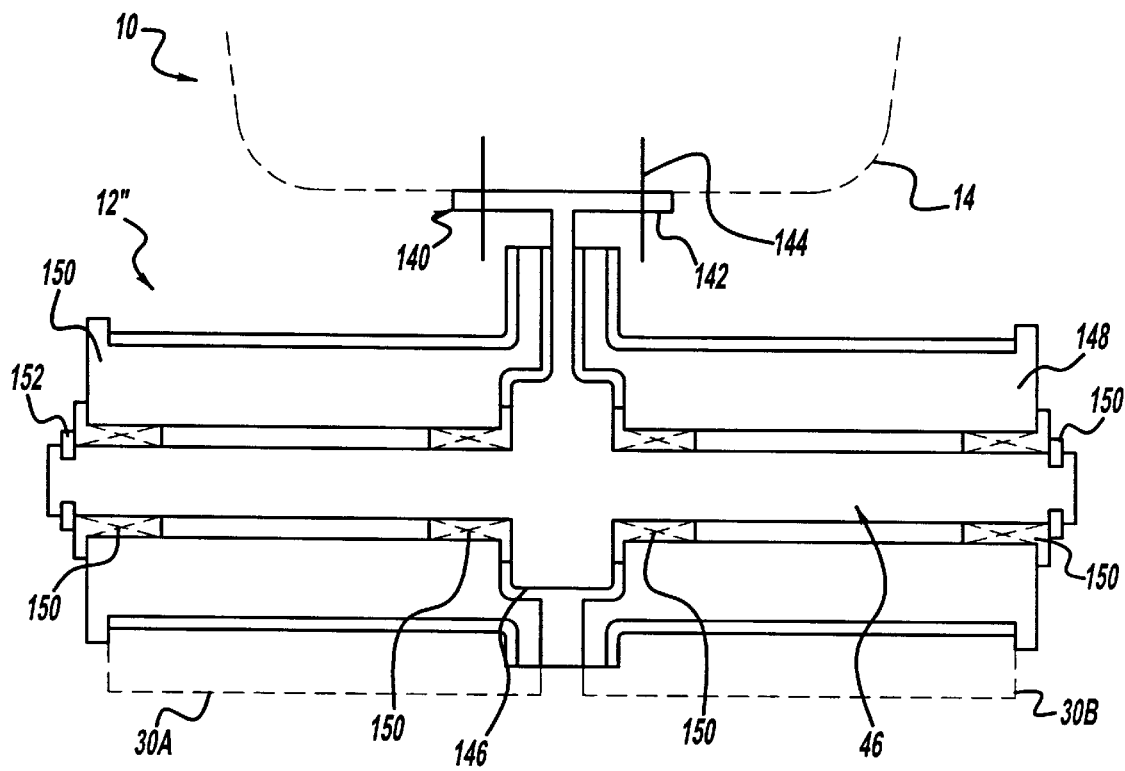
FIG. 14 is fifth alternative arrangement for interconnecting the drive shaft with the body of the amphibious vehicle.

Turning now to FIG. 14, a second alternative embodiment of the vehicle propulsion system 12" of the present invention is illustrated. The propulsion system 12" is shown to include an alternative mounting arrangement for interconnecting the drive shaft 46 and non-driven shafts with the body 14 of the personal amphibious vehicle 10. The mounting arrangement includes a plurality of pedestals 140 bolted or otherwise suitably attached to the housing 14. To this end, the pedestal includes a mounting flange 142, including apertures 144 for receiving fasteners. Each of the plurality of pedestals 140 is interconnected to a structural load bearing support member 146 which is integrally formed to include a fixed drive axle. A pair of drive rollers 148 and 150 are rotatably connected to the fixed drive axle through suitable bearings 150. Snap rings 152 are located at the distal ends of the fixed drive axle 46 to prevent lateral displacement.

Figure 16:
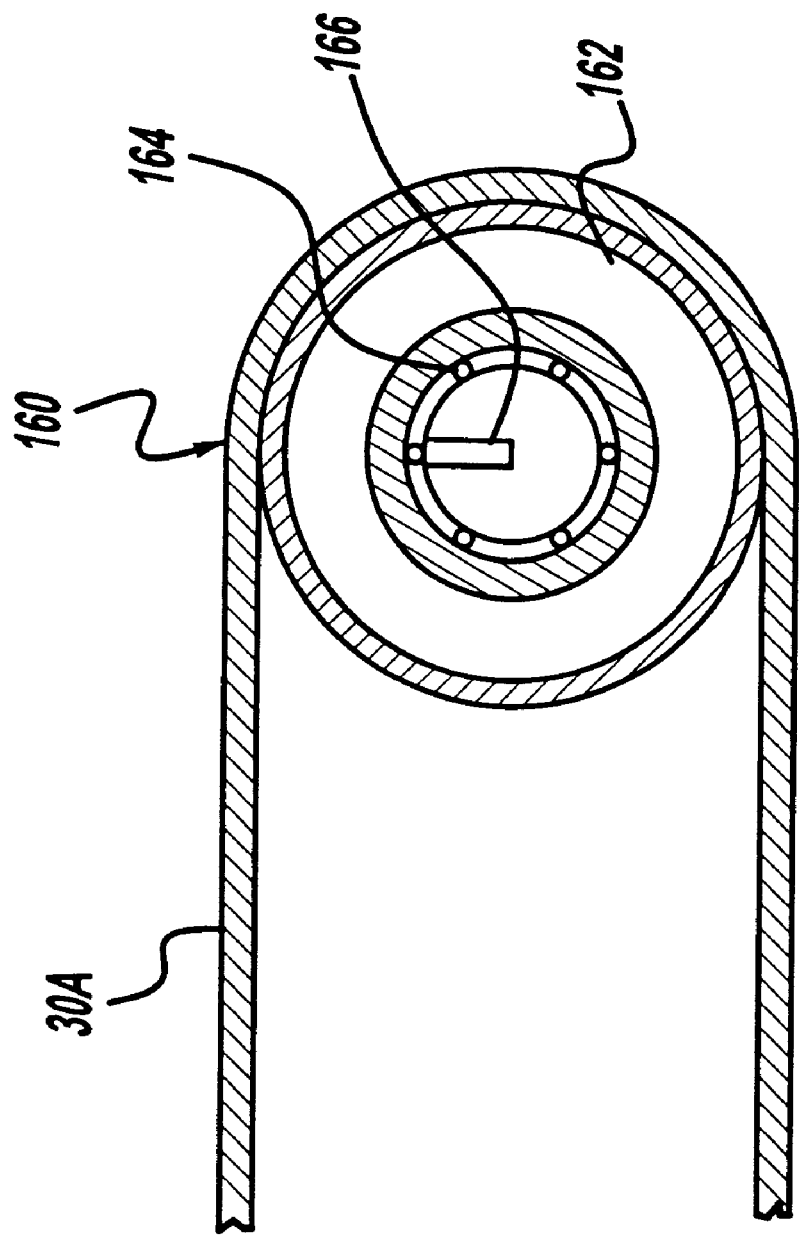
FIG. 16 is a sectional view illustrating an inflatable roller, track tension adjustment and control enhancement for the amphibious vehicle of FIG. 1.

Turning now to FIG. 16, an alternate embodiment illustrating an inflatable roller, tension track adjustment and control enhancement for the amphibious vehicle 10 of the present invention is illustrated. As shown, the alternative embodiment incorporates an inflatable roller 160. In the exemplary form shown, the inflatable roller 160 is a tubeless tire-type inflatable roller which defines an inflation pressure cavity 162. The embodiment preferably includes two inflatable rollers 160, one associated with each of the tracks 30a and 30b. The embodiment is shown to further include a tubeless-type rim 164 and a valve stem 166 associated with each inflatable roller 160. The outer periphery of the inflatable roller 160 and inner periphery of the track 30 may be splined, toothed, serrated, knobbie, threaded, or smooth. Suitable bearings or bushings (not shown) are positioned between the inflatable rollers 160 and a fixed axle (not shown). The fixed axle (not shown) may be retained to the mounting bracket 38, which is substantially identical to that described above, by retaining rings disposed on opposite ends of the fixed axle (not shown), or as shown, a retaining ring on one end and a shoulder integrally formed with the fixed axle on the other end. It will be understood by those skilled in the art that the inflatable roller 160 configuration of FIG. 16 may be utilized with any of the foregoing described axle/spindle and bearing constructions and/or in conjunction with the previous described vertical lift water ducts.

The foregoing discussion discloses and describes merely an exemplary embodiment of an apparatus constructed in accordance with the present invention and a related method. One skilled in the art will readily recognize from such discussion and from the accompanying drawings that various changes, modifications and variations can be made thereto without departing from the spirit and scope of the present invention. For example, it will be understood that the propulsion system of the present invention may be adapted to a wide variety of existing vehicle types including but not limited to the following:

1. Land, sand, water, snow, ice, mud, swamp and amphibious vehicles.
2. Small personal craft.
3. Larger multi-passenger craft.
4. Amphibious personnel vehicle carrier.
5. Graters, front-end loaders, front and back hose, bulldozers, cranes, paving machines, and other earth moving or construction equipment.
6. Amphibious flatbed barge/ferry for vehicles and cargo.
7. Mobile, linkable, amphibious bridge for land vehicles.
8. Amphibious army tank and other military vehicles.
9. Amphibious or reduced terrain pressure farm implements, tractors and combines.
10. Amphibious all-terrain combined snowmobile and personal watercraft.

What is claimed:

1. An amphibious personal vehicle, the vehicle comprising:
    a frame;
    first and second continuous belt tracks rotatably interconnected to said frame;
    a control arrangement for independently controlling each of said first and second continuous belt tracks; and
    a mounting bracket attached to said frame and a drive shaft rotatably supported by said bracket, said first and second continuous belt tracks rotatably supported by said drive shaft, said drive shaft being a split shaft having first and second ends rotatable at different speeds;
    both of said first and second continuous belt tracks including a belt portion and a plurality of blades, each blade of said plurality of blades oriented oblique with a reference line extending perpendicular to a longitudinal axis of an associated one of said first and second continuous belt tracks.

2. The amphibious vehicle of claim 1, wherein each of said belt portions includes a plurality of transversely disposed grooves and wherein said drive shaft includes a plurality of splines for engaging said plurality of transversely disposed grooves.

3. The amphibious vehicle of claim 1, wherein said mounting bracket is generally U-shaped having a first portion attached to an underside of said frame and a pair of downwardly extending legs rotatably supporting said drive shaft.

4. The amphibious vehicle of claim 1, further comprising first and second output shafts for independently driving said first and second ends of said drive shaft, respectively.

5. The amphibious personal vehicle of claim 4, further comprising:
    a first drive gear carried by said first output shaft;
    a second drive gear carried by said second output shaft;
    first and second drive chains interconnecting said first and second drive gears with said first and second ends of said drive shaft, respectively.

6. The amphibious vehicle of claim 1, wherein said drive shaft includes a first portion supporting said first continuous belt track and a second portion for supporting said second continuous belt track, said first and second portions adapted to rotate relative to one another at distinct speeds.

7. An amphibious personal vehicle, the vehicle comprising:
    a frame;
    first and second continuous belt tracks rotatably interconnected to said frame;
    a control arrangement for independently controlling each of said first and second continuous belt tracks; and
    a mounting bracket attached to said frame and a drive shaft rotatably supported by said bracket, said first and second continuous belt tracks rotatably supported by said drive shaft, said drive shaft including a first portion supporting said first continuous belt track and a second portion for supporting said second continuous belt track, said first and second portions adapted to rotate relative to one another at distinct speeds;
    both of said first and second continuous belt tracks including a belt portion and a plurality of blades, each blade of said plurality of blades oriented oblique with a reference line extending perpendicular to a longitudinal axis of an associated one of said first and second continuous belt tracks.

8. An amphibious personal vehicle, the vehicle comprising:
    a frame;

first and second continuous belt tracks rotatably interconnected to said frame;

a control arrangement for independently controlling each of said first and second continuous belt tracks;

a mounting bracket attached to said frame and a drive shaft rotatably supported by said bracket, said first and second continuous belt tracks rotatably supported by said drive shaft; and a central divider disposed between said first and second continuous belt tracks for diverting a source of water in an upwardly direction from between adjacent ones of said plurality of blades towards said frame;

both of said first and second continuous belt tracks including a belt portion and a plurality of blades, each blade of said plurality of blades oriented oblique with a reference line extending perpendicular to a longitudinal axis of an associated one of said first and second continuous belt tracks.

9. The amphibious vehicle of claim 8, wherein each blade is oriented at a skew angle of between approximately 7–12° with respect to said longitudinal axis.

10. The amphibious vehicle of claim 8, wherein each blade extends substantially perpendicular from an associated one of said belt portions.

11. The amphibious vehicle of claim 8, wherein each blade extends from an associated one of said belt portions at a blade angle of between approximately 97°–102°.

12. The amphibious vehicle of claim 8, wherein each blade angles toward a front of the amphibious personal vehicle as it progresses from an outboard side of the vehicle to a longitudinally extending vehicle centerline.

* * * * *